3,018,281
PROCESS FOR PRODUCING SURFACE-ACTIVE AGENTS FROM SUCROSE
Samuel B. Crecelius, St. Paul, Minn., assignor to Economics Laboratory, Inc., St. Paul, Minn., a corporation of Delaware
No Drawing. Filed Apr. 27, 1959, Ser. No. 808,948
2 Claims. (Cl. 260—209)

This invention relates to surface-active agents, and has for its object the provision of improved surface-active agents and an improved process for forming the agents from sucrose. The invention provides an efficient process for producing the new surface-active agents from relatively cheap and available materials. The process can be carried out easily and simply with water as a solvent thus avoiding the use of the expensive solvents required in the processes heretofore proposed for forming surfactants from sugar.

This invention is based on the discovery that the reaction product of sucrose with an aliphatic epoxide having in excess of eight carbon atoms is an effective surfactant. The aliphatic epoxide preferably consists of a mixture of a low molecular weight epoxide such as butylene or propylene oxide and a high molecular weight epoxide such as octylene oxide, dodecene oxide or olefin oxide $C_{16}$–$C_{18}$. The presence of lower molecular weight oxides, such as butylene oxide or propylene oxide helps solubilize the higher weight epoxide making it possible for the reaction to take place smoothly. In carrying out a process of the invention I produce an ether of sucrose which has outstanding properties by virtue of the relatively large hydrophobe radical of the epoxide compound.

Suitable butylene oxide and propylene oxide are available from The Dow Chemical Company which supplies commercial grades of these epoxides as follows:

BUTYLENE OXIDE S

This product is a mixture of butylene oxide polymers which is soluble in most organic solvents but only slightly soluble in water. It has the following properties: B.P. 60–67° C., mol. wt. 72.1, sp. gr. at 25° C.—0.86, refractive index at 25° C.—1.381, viscosity at 25° C.—0.40 centipoises, and flash point 5° F.

BUTYLENE M

This product is a mixture of the isomers 1,2-butylene oxide, cis and trans 2,3-butylene oxide, and isobutylene oxide (about 10%). The remaining properties are not significantly unlike those of Butylene Oxide S. Butylene Oxide M is preferred because of its lower cost.

The propylene oxide which is commercially available from several sources may be used. It is infinitely soluble in most organic solvents, and only slightly soluble in water. One suitable product has the following properties: colorless liquid, B.P., 34.2° C., mol. wt., 58.1, sp. gr., 25° C.—0.826, refractive index at 25° C.—1.363, viscosity at 25° C.—0.28 centipoises and flash point, 20° F.

The octylene oxide which may be used is a mixed epoxidized olefin containing two isomers with the following structure:

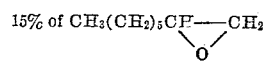

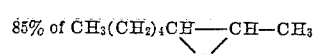

It has the following properties:

Assay _____ 11.8% oxirane oxygen.
Average molecular weight ____ 128.
Freezing point _____ Below −50° C.
Boiling point _____ 76.78° C. at 45 mm.
Density at 25° C. _____ 0.830.
Refractive index at 25° C. ___ 1.4160.
Solubility _____ Very slight in water, soluble in most organic solvents.

The dodecene oxide which may be used is an epoxidized olefin, 1,2-epoxy dodecene, having the following structure:

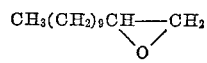

It has the following properties:

Assay _____ 7.7% oxirane oxygen.
Molecular weight _____ 184.
Freezing point _____ −10° to −12° C.
Boiling point _____ 97.98° C. at 3.5 mm.
Density at 25° C. _____ 0.836.
Refractive index at 25° C. __ 1.4347.
Solubility _____ Insoluble in water, soluble in most organic solvents.
Color _____ Colorless.

The $C_{16}$–$C_{18}$ olefin oxide which may be used is a mixed epoxidized olefin composed of the following isomers:

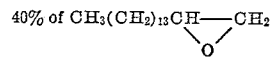

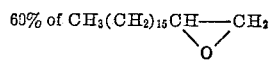

It has the following properties:

Assay _____ 5.7% oxirane oxygen.
Average molecular weight ____ 256.
Freezing point _____ 14° to 15° C.
Boiling point _____ >110° C. at 0.5 mm.
Density at 25° C. _____ 0.842.
Refractive index at 25° C. ___ 1.4446.
Solubility _____ Insoluble in water, soluble in most organic solvents.
Color _____ Colorless.

It is known that epoxide groups will react with hydroxyl groups, carbonyl groups and lactone groups all of which are found in sucrose. There is considerable evidence to indicate that the epoxide reacts with the sucrose to form ether linkages and that free hydroxyl groups are present. However, it was entirely unexpected that certain epoxide groups would form a compound with sugar having exceptional surfactant properties.

The epoxide-sucrose addition products are light colored viscous liquids soluble in water, alcohol and benzene. They are stable to heat up to about 150° C. at which point they begin to darken and decompose. To obtain the best surfacant characteristics, the high molecular weight epoxides; that is, those containing more than eight carbon atoms, should be present in the reaction product in the ratio of one mol plus or minus 10 percent to the one mol of sucrose. The low molecular weight epoxides; that is butylene oxide or propylene oxide, should be present in the ratio of two to eight mols per one mol of sucrose. Various products were prepared using from two to eight mols of epoxide per mol of sucrose in water solutions and in the presence of a trace of strong acid catalyst such as sulfuric acid. Increase in the epoxide content caused the addition product to be more stable when heated but less soluble in hot water. The product obtained by the reaction of 5.5 mols of butylene oxide plus one mol of $C_8$ or over of epoxide with one mol of sucrose was most applicable for preparing the most effective ether product of the invention. The reaction is exothermic, and the reaction mixture will rise to about 70° C. of its own accord. In the final part of the reaction, the temperature must be raised to 100–110° C. The addition of the epoxide takes from 5 to 8 hours. The acidity from the catalyst is then neutralized with a weak solution of KOH. The products may be used in this form as surfactants. These products are useful as surfactants for various detergent purposes without further chemical treatment. They are more alkaline stable than the ester type sugar surfactants because they contain only ether linkages.

The following examples illustrate the preparation of the reaction product of sucrose and high molecular weight epoxides.

*Example I*

(a) 171 grams sucrose
(b) 50 grams water
(c) 5 drops concentrated sulfuric acid
(d) 200 grams butylene oxide
(e) 92 grams dodecene oxide The (b) above was added to a three neck reaction flask equipped with a reflux condenser, thermometer, and stirrer. The (a) above was then added and the mixture heated to 70–80° C. with stirring until it went into solution. The (c) was then added and mixed in well. (d) was then added dropwise to the reaction mixture with continued stirring while the reaction temperature was maintained at 75–80° C. during the entire addition. After all of (d) was added, the temperature of the reaction mixture was raised to 100–110° C., and the dropwise addition of (e) was begun with continued stirring. The reaction temperature was maintained at 100–110° C. throughout the addition of (e) which took about 5¾ hours. The reaction mixture was then allowed to stir at the same temperature for 30 more minutes. The resulting reaction was a golden clear liquid. The product had the following characteristics: The liquid remained clear when diluted to 40% with water. Surface tension at 25° C. and 0.1% concentration is 26.1 dynes/cm. Sheeting and spreading characteristics were good at 300 p.p.m. concentration in water.

A 0.5% solution of the material gave good results in removing soil from cotton and wool cloth.

When a 50% solution of the material in water was applied directly to hands which had been soiled with carbonized hydrocarbon grease and then rinsed with water, the hands were left completely clean.

It is obvious from the surface tension obtained and the cleaning experiments performed above that this mixed ether of sucrose is acting as a potent surfactant.

*Example II*

(a) 171 grams sucrose
(b) 50 grams water
(c) 5 drops concentrated sulfuric acid
(d) 200 grams butylene oxide
(e) 64 grams octylene oxide The (b) above was added to a three neck reaction flask equipped with reflux condenser, thermometer and stirrer. The (a) above was then added to the water and the mixture was stirred and heated to 70–80° C. until it went into solution. The (c) above was then added and mixed in well. Then begin adding (d) dropwise with agitation, maintaining the temperature at 75–80° C. When all of (d) had been added, the solution was then heated to 100–110° C., and the addition of (e) was begun dropwise. The temperature was maintained at 100–110° C. throughout the addition of (e). The total time of addition was 5½ hours. After all of (e) was added, the batch was held at this temperature with stirring for 30 minutes. The final product had the following characteristics: The product remained clear upon dilution to 50% with water. Surface tension at 25° C. and 0.1% concentration in distilled water is 40.0 dynes/cm.

This product also showed surface-active and detergency characteristics.

*Example III*

(a) 171 grams sucrose
(b) 50 grams water
(c) 5 drops concentrated sulfuric acid
(d) 200 grams butylene oxide
(e) 127 grams $C_{16}$–$C_{18}$ olefin oxide The (b) above was added to a three neck reaction flask fitted with a reflux condenser, thermometer and stirrer. The (a) above was then added to the (b) and the mixture heated at 70–80° C. until it was all in solution. The (c) was then added and mixed in thoroughly. The dropwise addition of (d) was then begun while the temperature was maintained at 75–80° C. with constant stirring. When all of (d) had been added, the temperature of the reaction mixture was raised to 100–110° C., and the addition of (e) was begun. The temperature of the reaction mixture was maintained at 100–110° C. throughout the reaction mixture. After all of (e) was added, the heating and agitation were continued for 30 minutes. Surface tension at 25° C. and 0.1% concentration in distilled water was 30.8 dynes/cm.

This material also showed surfactant and detergent properties when used in the conventional manner.

*Example IV*

(a) 106 grams sucrose (0.33 mol)
(b) 50 grams water
(c) 5 drops concentrated sulfuric acid
(d) 104 grams propylene oxide (1.79 mols)
(e) 60 grams dodecene oxide (0.33 mol)

The (b) was added to a three neck reaction flask equipped with a reflux condenser, thermometer, and stirrer. The (a) was then added and the mixture heated to 70–80° C. with stirring until it was completely in solution. The (c) was then added and mixed thoroughly. (d) was then added dropwise to the reaction mixture and the temperature maintained at 70–80° C. throughout the addition with constant stirring. After the addition of (d) was completed, the reaction temperature was raised to 100–110° C. with constant agitation and the addition of (e) was begun. The time for the complete addition of (e) was about two hours. After the addition of (e) was completed, the product was allowed to mix for about 30 minutes.

This product showed fairly good sheeting and rinsing characteristics at 200 p.p.m. in a rinse test.

This application is a continuation-in-part of my application Serial No. 722,865, filed March 21, 1958.

I claim:
1. The process of producing a surface active compound from sucrose, which comprises reacting one mol of sucrose dissolved in water with from three to eight mols of an epoxide selected from the group consisting of butylene oxide and propylene oxide at a temperature of from 75° C. to 80° C. and reacting the resulting product with about one mol of dodecene oxide at temperatures of from 100° C. to 110° C. and thereby producing a water soluble surfactant compound.
2. The product resulting from the process of claim 1.

References Cited in the file of this patent

UNITED STATES PATENTS

| | | |
|---|---|---|
| 1,863,208 | Schorger | June 14, 1932 |
| 2,450,079 | Brown | Sept. 28, 1948 |
| 2,652,394 | De Groote | Sept. 15, 1953 |

OTHER REFERENCES

Hackh's Chemical Dictionary, Third Ed., 1944, p. 53, col. 1.